United States Patent

[11] 3,611,130

| [72] | Inventors | Neil T. Larsen<br>Broomfield;<br>Frederick R. Clague, Boulder, both of Colo. |
|---|---|---|
| [21] | Appl. No. | 20,312 |
| [22] | Filed | Mar. 17, 1970 |
| [45] | Patented | Oct. 5, 1971 |
| [73] | Assignee | The United States of America as represented by the Secretary of Commerce |

[54] POWER MEASURING AND LEVELING SYSTEM USING A SELF-BALANCING BRIDGE
6 Claims, 1 Drawing Fig.

[52] U.S. Cl. .................................................. 324/106, 324/95, 324/98
[51] Int. Cl. ............................................ G01r 5/26, G01r 17/02
[50] Field of Search .................................. 324/106, 95, 98

[56] References Cited
UNITED STATES PATENTS

| 2,565,922 | 8/1951 | Howard ...................... | 324/95 |
| 2,799,826 | 7/1957 | Eberle ........................ | 324/95 |

*Primary Examiner*—Rudolph V. Rolinec
*Assistant Examiner*—Ernest F. Karlsen
*Attorneys*—David Robbins and Alvin J. Englert ABSTRACT: With no RF power applied to a bolometer positioned in a self-balancing DC bridge, the voltage across a diagonal is nulled with the output of a potentiometer. The diagonal voltage V is measured. The output of the potentiometer is applied to a unity gain buffer amplifier. Part of the power in the output of an RF power source is applied to the bolometer, and the difference $\Delta V$ between diagonal and the amplifier output voltages is measured. Using V and $\Delta V$, the power applied to the bolometer is calculated. The diagonal and potentiometer voltages are compared to derive a difference signal used to adjust the level of power applied to the bolometer. Part of the power in the output of the RF source is also applied to a load.

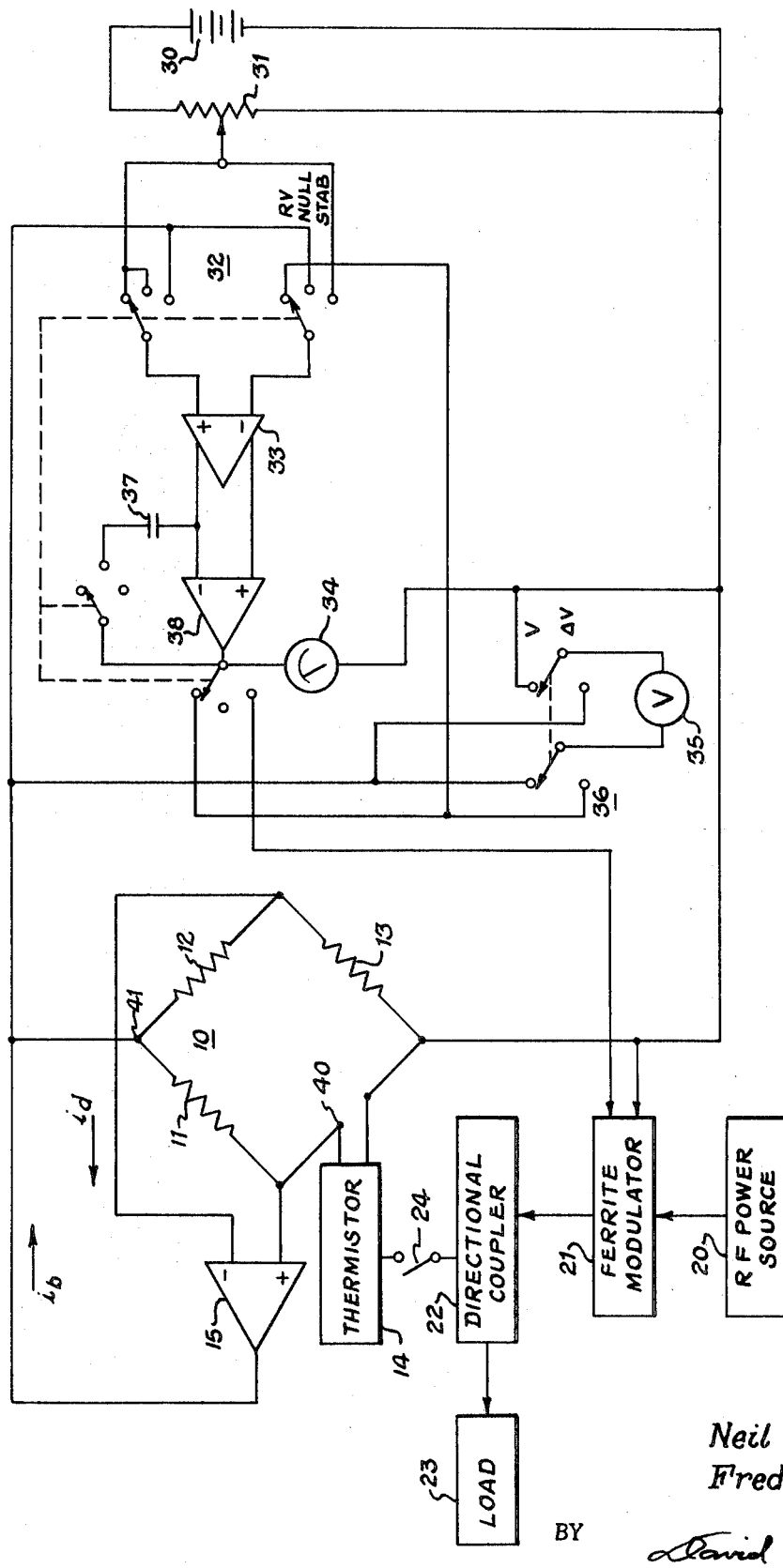

POWER MEASURING AND LEVELING SYSTEM USING A SELF-BALANCING BRIDGE

BACKGROUND OF THE INVENTION

There are several systems in the prior art that use a bolometer in one arm of a Wheatstone bridge to measure RF power. In one system of this type, a bolometer is positioned in an arm of the bridge and a resistor is positioned in each of the other arms. The bridge is brought to balance without RF power applied to the bolometer. The voltage $E_o$ across one arm of the bridge is nulled with the output of a calibrated potentiometer. When this is done, the voltage indicated by the potentiometer is equal to $E_o$ and is measured. RF power is then applied to the bolometer and the bridge is rebalanced without altering the output of the potentiometer. The voltage across the latter arm is now $E_l$ and the output voltage of the potentiometer is $E_o$. The voltage difference $\Delta E$ between $E_o$ and $E_l$ is measured and using the values of $E_o$ and $\Delta E$ in an appropriate formula, the power applied to the bolometer is calculated.

If in measuring the voltage difference $\Delta E$ a null is obtained and detected with a potentiometric voltmeter, it can be shown by Thevenin's theorem that there is no loading error since current does not flow in the measuring circuit. When, however, a nonpotentiometric voltmeter is used in the measuring circuit, there is current flow and a loading error.

Assume, for example, that a 200 ohm equal arm Wheatstone bridge is used and that the calibrated potentiometer has a resistance of approximately 2,000 ohms. The potentiometer will be set approximately in the middle when its output is nulled with $E_o$, to give an output resistance of 500 ohms. $E_o$ will be measured from a point that has approximately a 75 ohm output resistance. Assume further that the nonpotentiometric voltmeter has a sensitivity of 1 megohm per volt. The voltage $E_o$ will be measured on the 3 volt range, typically, where the input impedance of the voltmeter is 3 megohms. The voltage $\Delta E$ will be measured on the 0.1 volt range, where the input impedance of the meter is 100,000 ohms. The loading error in measuring $E_o$ under these conditions will be 3 parts in $10^5$, and the loading error in measuring $\Delta E$ will be approximately 5 parts in $10^3$, giving a total error of approximately 5 parts in $10^3$. The errors are not correctable by computation because they are strong functions of the components used, and increase substantially when the voltmeter has lower sensitivity, e.g., 20,000 ohms per volt.

In the present system, the voltage across a diagonal of a self-balancing DC bridge is nulled with the output of a DC potential source when RF power is not applied to a bolometer located in one arm of the bridge. The value of the diagonal voltage V is measured. After RF power is applied to the bolometer, the bridge is rebalanced without changing the output of the potential source. A unity gain buffer amplifier is connected to the output of the potential source and the difference voltage $\Delta V$ between the output of the amplifier and the diagonal voltage is measured. It can be shown from Thevenin's theorem that with this arrangement $\Delta V$ can be measured to a high degree of accuracy, using a potentiometric or a nonpotentiometric voltmeter.

As an example, assume that a 200 ohm equal arm bridge is used. The voltage V is measured across a diagonal of the bridge, i.e., from a point having an output resistance of approximately 0.00025 ohms, and because of the buffer amplifier, $\Delta V$ is measured from a point having an output resistance of 0.001 ohms. With the nonpotentiometric voltmeter described above, the error in measuring V will be less than one part in $10^8$ and the error in $\Delta V$ will be 1 part in $10^8$, with a total error no greater than 2 parts in $10^8$.

With reference to power leveling systems, there are arrangements in the prior art that employ a bolometer located in an arm of a Wheatstone bridge to regulate the amplitude of RF energy applied to the bolometer and to a load. In one such arrangement, a portion of the energy generated by an RF source is split off by a directional coupler and is applied to a bolometer in one arm of a self-balancing DC bridge. Amplitude fluctuations of the RF energy applied to the bolometer are reflected in the current supplied by an amplifier to maintain bridge balance. The current flows through a resistor to develop a voltage that is compared with the output of a DC potential source to derive a correction signal. The latter signal is used to adjust the amplitude of the energy provided by the RF source and to maintain the amplitude level. See "Amplitude Stabilization of a Microwave Signal Source" by Glenn F. Engen in *IRE Transactions on Microwave Theory and Techniques*, Vol. MTT–6, No. 2, pp. 202 to 206, Apr. 1958.

In the present system, when the energy applied to the bolometer is to be stabilized, the output of the DC potential source is switched into a stabilization circuit. Fluctuations in the RF output cause variations in the amplitude of the diagonal voltage. The voltage across the diagonal is compared with the output of the DC potential source to obtain a correction signal, which is used to stabilize the output of the RF power source. IN this way, the DC potential source performs a dual function, one in the nulling circuit and the other in the stabilization circuit.

BRIEF DESCRIPTION OF THE DRAWING

The FIGURE illustrates an embodiment of the present invention.

SUMMARY OF THE INVENTION

In accordance with the present invention, a bolometer is positioned in at least one arm of a self-balancing bridge. With no RF power applied to the bolometer, the voltage across a diagonal of the bridge is nulled with the output of a variable DC potential source and the diagonal voltage V is measured. The output of the potential source is applied to a unity gain buffer amplifier, an RF power source is applied to the bolometer, and the difference voltage $\Delta V$ between the diagonal and the output of the amplifier is measured. From the values of V and $\Delta V$, the level of power applied to the bolometer may be calculated. When the power in the output of the RF source is to be stabilized, the magnitude of the output voltage of the DC source is compared with the diagonal voltage of the bridge. This is done to derive a control signal having a magnitude that is dependent upon the difference in magnitudes between the compared voltages. The latter signal is used to operate an arrangement for controlling the output level of the RF power source and for maintaining the level substantially constant. Part of the power in the output of the RF source is applied to a load.

DESCRIPTION OF THE PREFERRED EMBODIMENT

A bolometer is a device used in the measurement of RF energy. It contains a resistive element that changes resistance as it is heated by the radiant energy. One type of bolometer is the barreter, which uses a short length of resistive wire and has a positive temperature coefficient of resistance; another type is the thermistor, which uses a small mass of resistive material and has a positive or negative temperature coefficient of resistance.

With reference to the figure, Wheatstone bridge 10 comprises resistors 11, 12 and 13, which are usually made equal, and a conventional thermistor 14 which has substantially the same resistance as the resistors when the bridge is balanced. It will be understood that a barreter could be used instead of the thermistor, provided the polarity of amplifier 15 is reversed.

The output of RF power source 20 is transmitted through ferrite modulator 21 and directional coupler 22 to lead 23. A portion of the power applied to the load is split off by the directional coupler and is applied through switch 24 to thermistor 14. A source of DC potential 30 is connected across potentiometer 31.

The input of differential amplifier 15 is connected across a first diagonal and the output of the amplifier is connected across the second diagonal of bridge 10. The amplifier senses the balance of bridge 10 and adjusts the bridge current $i_b$ up or down to maintain a null at the amplifier input terminals. When the bridge is initially energized bridge current $i_b$ flows through thermistor 14 which in this embodiment has a negative temperature coefficient of resistance, heating the thermistor and lowering its resistance until it is substantially equal to that of resistor 13 and the bridge is balanced. If current $i_b$ then decreases in value, the temperature of thermistor 14 will be lowered and its resistance will be increased. The value of detector current $i_d$ will increase, which in turn increases the input to amplifier 15 and raises the value of bridge current $i_b$ to its initial value Similarly, an increase in bridge current $i_b$ will result in a lower amplifier input which will tend to decrease the bridge current. The system thus seeks and maintains an operating point where the ratio of bridge current $i_b$ to detector current $i_d$ is substantially equal to the amplifier gain. For a high-gain amplifier this operating point will be very close to the the point of bridge balance, and detector current $i_d$ will be very close but not necessarily equal to zero.

The operation of the system in the figure is as follows. When it is desired to measure the magnitude of the power applied to thermistor 14, the switch 24 is initially opened and the arms of switch 32 are thrown to the NULL position. This connects capacitor 37 across amplifier 38 which then performs the functions of an integrator. Bridge 10 is balanced, as set forth above, and the voltage appearing across the second diagonal of the bridge is applied through function switch 32 to the negative input terminal of amplifier 33, which, together with amplifier 38, functions in this mode of operation as a differential amplifier having a gain of $10^7$. The voltage appearing on the slider of potentiometer 31 is applied to the other terminal of amplifier 33 and is adjusted until a null is obtained, which occurs when the movement of the pointer on meter 34 is stopped anywhere on scale. The arms of switch 36 are then thrown to the V position and the voltage V across the second diagonal of the bridge is read on nonpotentiometric voltmeter 35 which may, for example, be a digital or moving coil D'Arsonval voltmeter, or low input impedance signal processing instrumentation.

Switch 24 is then closed, applying RF power to thermistor 14 and switch 32 is thrown to the position marked RV. When 32 is in the RV position, the output of amplifier 38 is connected to the negative or inverting input terminal of amplifier 33 and the slider of potentiometer 31 is connected to the other input terminal. Thus, 33 and 38 are connected together as a unity gain buffer amplifier which isolates the potentiometer from loading errors.

Switch 36 is then thrown to the $\Delta V$ position. This applies the voltage across the second diagonal of bridge 10 to one terminal of nonpotentiometric voltmeter 35 and the output of amplifier 38 to the other terminal. The voltmeter reads $\Delta V$.

The RF power $P_{rf}$ applied to thermistor 14 is calculated from the relationship
$P_{rf}=K(2V-\Delta V) \Delta V.$ (1) The value of $K$ is given by (2) where $R_o$ is the operating resistance of thermistor 14 and R is the value of each of the two "top" arms (resistors 11 and 12) of bridge 10.

It will be apparent from formula (1) that potentiometer 31 may be adjusted to obtain a certain value of $\Delta V$ which in turn will provide a desired value of $P_{rf}$.

The level of power applied to thermistor 14 is stabilized through a servo loop whose operation is illustrated by the following example. Assume that function switch 32 is thrown to the STAB position and the RF power applied to thermistor 14 increases in value. The resistance of the thermistor decreases and consequently the voltage at terminal 40 goes negative. The output of amplifier 15 decreases, which in turn decreases the voltage at point 41, the top of bridge 10. The voltage at 41 is compared with the voltage at the slider of potentiometer 31 in the input of differential amplifier 33 and the difference voltage is amplified. The output of amplifier 38 controls ferrite modulator 21 to increase the attenuation of the output of RF power source 20. This returns the level of the power applied to thermistor 14 to its original value. From this example it is seen that the voltage across the second diagonal of bridge 10 is compared with the voltage across the output of potentiometer 31 to derive a control signal having a magnitude dependent upon the difference in magnitudes between the compared voltages. The control signal is applied to ferrite modulator 21 to adjust its attenuation and thereby level the output of directional coupler 22. In this way the output level of 22 is maintained substantially constant and the output may be adjusted with high precision by means of potentiometer 31.

We claim:
1. A power measuring system comprising:
 a Wheatstone bridge having a first and second diagonal,
 a bolometer positioned in at least one arm of said bridge,
 a differential amplifier having an input connected across the first diagonal an an output connected across the second diagonal of said bridge, whereby a null is maintained at the input of said differential amplifier,
 a variable direct current potential source,
 a radio frequency power source having a variable output,
 means for selectively applying power from the output of said power source to said bolometer,
 means for comparing the magnitude of the voltage across the second diagonal of said bridge with the magnitude of the output of said potential source when power from the output of the power source is not applied to said bolometer and for adjusting the output of said potential source until a null is obtained, whereby said potential source provides a selected voltage,
 a buffer amplifier,
 means for applying the selected voltage provided by said direct-current potential source to the input of said buffer amplifier, and
 nonpotentiometric voltage measuring means for measuring the voltage V across the second diagonal of said bridge when the last-mentioned null is obtained and for measuring the difference voltage $\Delta V$ between the output voltage of said buffer amplifier and the voltage across the second diagonal of said bridge when power from the output of said power source is applied to said bolometer, whereby the power applied to said bolometer may be calculated from the values of V and $\Delta V$.

2. The measuring system set forth in claim 1 including:
 means for comparing the magnitude of the selected voltage provided by said potential source and the voltage across the second diagonal of said bridge when power from the output of said power source is applied to the bolometer and for providing a control signal having a magnitude dependent upon the difference in magnitudes between the compared voltages and
 means responsive to said control signal for adjusting the level of power obtained form the output of said power source and for maintaining said level substantially constant.

3. The measuring system set forth in claim 2 including:
 a load, and
 means for applying part of the power that is maintained level to said load.

4. A power measuring system comprising:
 A Wheatstone bridge having a first and second diagonal.
 said second diagonal having a first and second end,
 a bolometer positioned in at least one arm of said bridge,
 a differential amplifier having an input connected across the first diagonal and an output connected across the second diagonal of said bridge, whereby a null is maintained at the input of said differential amplifier,
 a radio frequency power source having a variable output,
 means for selectively applying power from the output of said power source to said bolometer,
 a variable direct current potential source, a second differential amplifier having a pair of inputs and an output connected to the input of a third amplifier, a voltmeter connected between the output of said third amplifier and the s second end of the second diagonal, capacitive means, means for selectively connecting the first end of the second diagonal to one input of said second amplifier, the output of said potential source to the other input of said second amplifier, and said capacitive means across said third amplifier, whereby the voltage across the second diagonal may be nulled with the output of said potential source when power from the output of said power source is not applied to said bolometer, a nonpotentiometric voltmeter, means for selectively connecting said nonpotentiometric voltmeter across the second diagonal of said bridge to measure the voltage V across the second diagonal when power from the output of said power source is not applied to said bolometer, means for selectively connecting said nonpotentiometric voltmeter between the first end of the second diagonal and the output of said third amplifier and for disconnecting said capacitive means from across said third amplifier when power from the output of said power source is applied to said bolometer, whereby the difference voltage $\Delta V$ between the second diagonal voltage and the output of said third amplifier is measured and the power applied to said bolometer may be calculated from the value of V and $\Delta V$.

5. The measuring system set forth in claim 4 including:

means for selectively connecting the first end of the second diagonal to one input of said second amplifier and the output of said potential source to the other input of said second amplifier and for disconnecting said capacitive means from across said third amplifier when power from the output of said power source is applied to said bolometer, and means responsive to the output of said third amplifier for adjusting the level of the power obtained form output of said power source and for maintaining said level substantially constant.

6. The measuring system set forth in claim 5 including:

a load, and means for applying part of the power that is maintained level to said load.

UNITED STATES PATENT OFFICE
CERTIFICATE OF CORRECTION

Patent No. 3,611,130           Dated October 5, 1971

Inventor(s) Neil T. Larsen and Frederick R. CLague

It is certified that error appears in the above-identified patent and that said Letters Patent are hereby corrected as shown below:

Column 2, line 18, "IN" should read --In--. Column 3, line 56, insert $-- K = \dfrac{1}{R_o (1+R/R_o)^2} --$. Column 4, line 19, "an" (first occurrence) should read --and--.

Column 5, line 4, delete "s". Column 6, line 16, "form should read --from--.

Signed and sealed this 21st day of March 1972.

(SEAL)
Attest:

EDWARD M. FLETCHER, JR.
Attesting Officer

ROBERT GOTTSCHALK
Commissioner of Patents